Sept. 8, 1931.     C. H. PLADSON     1,822,822
HOG GRIP AND HOOK
Original Filed Aug. 3, 1929    2 Sheets-Sheet 1
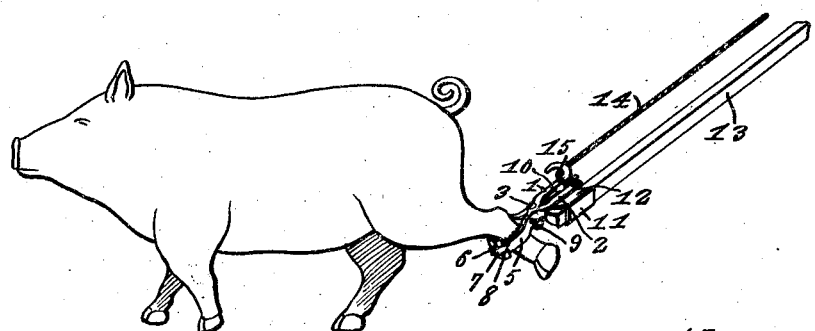
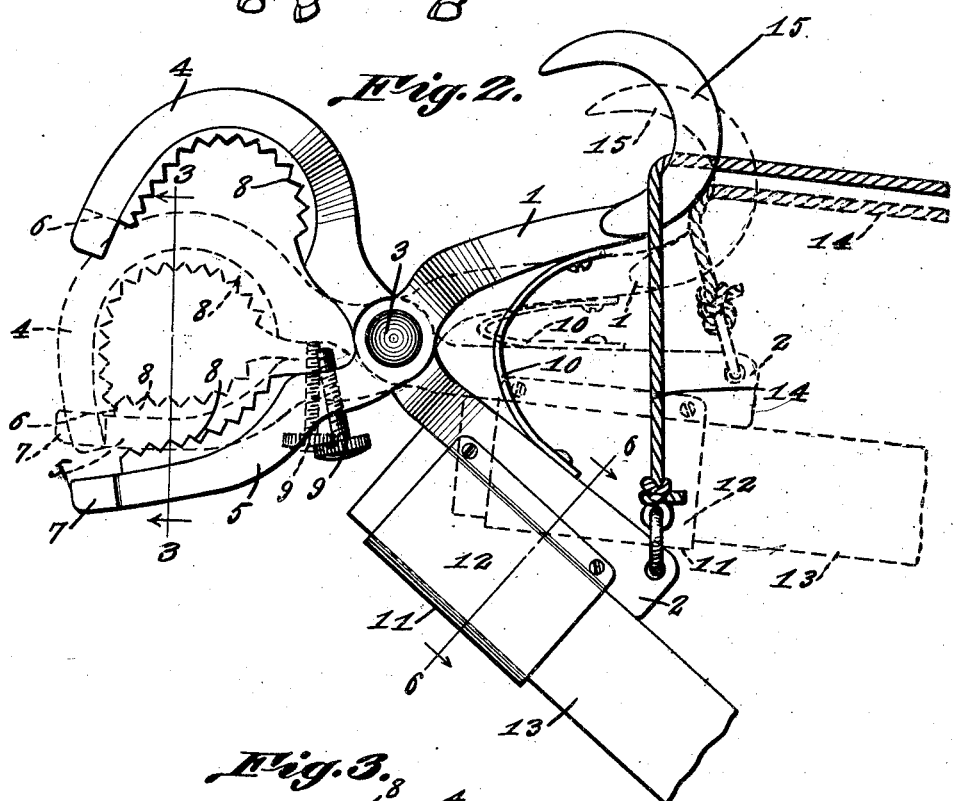
C. H. Pladson, INVENTOR
BY Victor J. Evans
ATTORNEY Sept. 8, 1931.  C. H. PLADSON  1,822,822
HOG GRIP AND HOOK
Original Filed Aug. 3, 1929   2 Sheets-Sheet 2

C. H. Pladson, INVENTOR
BY Victor J. Evans
ATTORNEY

Patented Sept. 8, 1931

1,822,822

UNITED STATES PATENT OFFICE

CARL HENRY PLADSON, OF BINSCARTH, MANITOBA, CANADA

HOG GRIP AND HOOK

Application filed August 3, 1929, Serial No. 383,284. Renewed February 24, 1931.

My present invention has reference to a hog catching and suspending device, and my object is the provision of an apparatus for this purpose whereby the hind leg of a hog may be readily gripped for catching the hog and whereby the hog will be held and may be suspended by the device for butchering.

A further object is the provision of a device for this purpose which is characterized by simplicity in construction, cheapness in manufacture and ease in operation.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a view illustrating the manner in which the hind leg of a hog is gripped by the improvement.

Figure 2 is a plan view of the improvement, the dotted lines showing the jaws of the device in closed position.

Figure 3 is a sectional view approximately on the line 3—3 of Figure 2, the jaws being closed.

Figure 4:
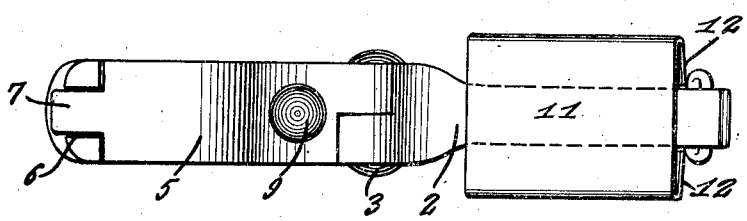
Figure 4 is a side elevation of the improvement.

My improvement contemplates the employment of two crossed handle members 1 and 2, respectively. The handle members, at the lapping portions thereof are pivotally connected, as at 3, and outward of the pivots each of the handle members is formed with a jaw. The jaw 4, formed on the end of the handle member 2 is substantially semi-circular in plan, while the jaw 5 formed on the end of the handle 1 has its outer end substantially straight. The end of the curved jaw 4 is formed with a notch 6 and the end of the comparatively straight jaw 5 is centrally formed with a reduced extension that provides a finger 7 that is designed to be received in the notch 6 when the jaws are closed.

Each of the jaws has on its inner or active face a compressible member or liner 8, and the confronting faces of these liners are preferably roughened or toothed, as disclosed by the drawings. There is screwed through the jaw 5, adjacent to the pivot 3, a headed bolt 9, and this bolt is designed to contact with the straight inner end of the jaw 4 for limiting the swinging of the jaws toward each other.

There is fixed on the inner and confronting faces of the handles 1 and 2 the ends of an arched spring 10, the said spring tending to force the handles away from each other and consequently normally sustaining the jaws in open position.

Fixed on the handle 2, and extending beyond the outer edge thereof there is a socket. This socket has its outer face flat, as indicated by the numeral 11, but its sides 12 are arranged at inward inclinations. This particular formation of the socket permits of the insertion therethrough of a pole or rod 13 of different cross sectional configurations and the angle walls 12 as well as the straight outer wall 11 will frictionally contact with the said pole for holding the same in the socket. The handle member 2, adjacent to its end is provided with an opening through which is threaded a cord or cable 14, the same, of course, being knotted adjacent to its connection with the said handle 2 and this cord or cable is directed around an outwardly directed substantially U-shaped hook 15 which is formed on the end of the handle member 1.

Figure 7:
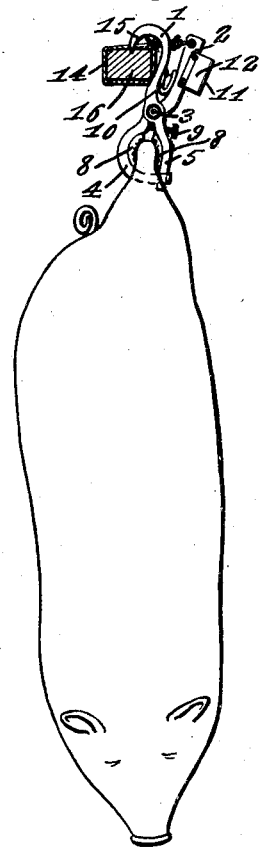
Figure 7 is a view to illustrate the manner in which the hog is suspended for butchering.
Figure 5:
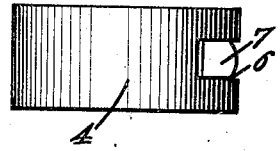
Figure 5 is an end view thereof.
Figure 6:
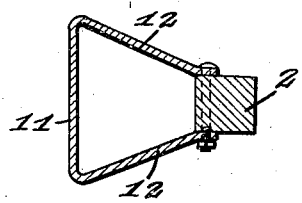
Figure 6 is a sectional view approximately on the line 6—6 of Figure 2.

When the device is employed for catching a hog the pole or rod 13 is inserted in the socket in the handle 2. The pole or rod may be of any desired length. The pole is grasped by one hand of the operator and the end of the cord or cable 14 is held by the second hand of the operator. The jaws are in their normal open position and the said jaws are brought to engage with the hind leg of a hog as disclosed by Figure 1 of the drawings. The operator now pulls upon the cord or cable 14 to close the jaws. In this manner it will be noted that the hog may be easily and quickly caught and moved, if desired, to a different pen or to a different location from that which it occupied or the hog may be suspended from a beam 16 for butchering. In this instance the pole or rod 13 is removed from the socket and the cable 14 is either wound around the beam 16 as disclosed by Figure 7 of the drawings or wound around the handle 2. The pointed end of the hook 15 will penetrate the beam 16 so that the hog will be normally held suspended as disclosed by Figure 7 of the drawings in a convenient position for butchering.

The compressible liners or facings 8 will prevent the jaws from inflicting injury to the leg of the animal. The jaws are limited in their movement toward each other by the adjustment of the bolt 9 and the said jaws are held in proper alinement when in closed position by the engagement of the finger 7 of the jaw 5 with the walls of the notch 6 in the jaw 4.

The hook is sharp pointed and is employed for the purpose of handling the hog while butchering, lowering and raising the hog in barrel or tank by inserting the same in the chin of the hog.

Having described the invention, I claim:

1. A device of the class described comprising two crossed pivotally connected handles, each having one end formed with a jaw, spring means between the handles for sustaining the jaws normally open, a socket on one handle for the reception of a pole, a rope secured to said handle and the second handle having a hooked end over which the rope is directed.

2. A device for the purpose set forth, comprising two crossed pivotally connected handles, each having one of its ends formed with a jaw, one of said jaws being curved in plan and the second jaw being comparatively straight, compressible lines on the confronting faces of the jaws, spring means between the handles for sustaining the jaws normally open, a socket on one of the handles for the reception of a pole, a rope secured to said handle and the second handle having a hooked end over which the rope is directed.

3. A device for the purpose set forth, comprising two crossed pivotally connected handles, each having one end formed with a jaw, one of said jaws being substantially U-shaped in plan and the other jaw being comparatively straight, the end of one of the jaws being notched and the end of the other jaw being formed with a reduced finger to be received in the notch when the jaws are closed, compressible facings for the jaws, spring means between the handles for sustaining the jaws normally open, a socket on one of the handles, a rope secured to said handle, and the second handle having a hooked end over which the rope is directed.

4. A device for the purpose set forth, comprising two crossed pivotally connected handles, each having one end formed with a jaw, one of said jaws being substantially U-shaped in plan and the other jaw being comparatively straight, the end of one of the jaws being notched and the end of the other jaw being formed with a reduced finger to be received in the notch when the jaws are closed, compressible facings for the jaws, spring means between the handles for sustaining the jaws normally open, a socket on one of the handles, a rope secured to said handle, and the second handle having a hooked end over which the rope is directed, and an adjustable element threaded through one of the jaws to be engaged by the second jaw for limiting the swinging of the jaws toward each other.

5. A device for the purpose set forth, comprising two crossed pivotally connected handles, each having one end formed with a jaw, one of said jaws being substantially U-shaped in plan and the other jaw being comparatively straight, the end of one of the jaws being notched and the end of the other jaw being formed with a reduced finger to be received in the notch when the jaws are closed, compressible facings for the jaws, spring means between the handles for sustaining the jaws normally open, a socket on one of the handles, a rope secured to said handle, and the second handle having a hooked end over which the rope is directed, means for limiting the swinging of the jaws toward each other and the socket having its outer face straight and its sides inclined toward each other.

In testimony whereof I affix my signature.

CARL HENRY PLADSON.